United States Patent [19]

Yasutake et al.

[11] 4,249,220

[45] Feb. 3, 1981

[54] CAPSTAN SERVO SYSTEM IN A RECORDING AND/OR REPRODUCING APPARATUS

[75] Inventors: Katsuya Yasutake, Yokohama; Akiyoshi Morita, Sagamihara, both of Japan

[73] Assignee: Victor Company of Japan, Ltd., Yokohama, Japan

[21] Appl. No.: 958,407

[22] Filed: Nov. 7, 1978

[30] Foreign Application Priority Data

Nov. 11, 1977 [JP] Japan .................................. 52-135322

[51] Int. Cl.³ ............................................ G11B 15/52
[52] U.S. Cl. ......................................... 360/73; 360/70
[58] Field of Search .................... 360/73, 70, 9, 10, 33; 318/327, 326; 235/92 DM

[56] References Cited

U.S. PATENT DOCUMENTS

| | | | |
|---|---|---|---|
| 3,564,141 | 2/1971 | Harst | 360/9 |
| 3,573,360 | 4/1971 | Rose | 360/73 |
| 3,772,468 | 11/1973 | Tatsuguchi | 360/73 |
| 3,893,169 | 7/1975 | Hall | 360/37 |
| 3,959,818 | 5/1976 | Iketaki | 360/70 |
| 4,148,077 | 4/1979 | Bragas | 360/10 |

Primary Examiner—Raymond F. Cardillo, Jr.
Assistant Examiner—Alan Faber

[57] ABSTRACT

A capstan servo system is used in a recording and/or reproducing apparatus which is capable of recording/reproducing either video signals of the NTSC system having a frame frequency of 30 Hz or video signals of the CCIR system having a frame frequency of 25 Hz. The capstan servo system detects the rotation of a capstan for driving a tape and produces an output frequency which is divided. A reference signal has a frequency corresponding to the frame frequency of the system of the video signal to be recorded on and/or reproduced from the tape. There is a phase comparison between the frequency divided signal and the reference signal. The frequency of the output signal of the detector is added to an error signal output of the phase comparison circuit. The resulting sum signal is used to control the rotation of the motor for driving the capstan. The detection circuit produces an output signal having a frequency of 150·M Hz (where M is a positive integer). The frequency division is capable of dividing the frequency of the output signal of the detection circuit with a selected frequency division ratio of 1/5M or 1/6M.

2 Claims, 3 Drawing Figures

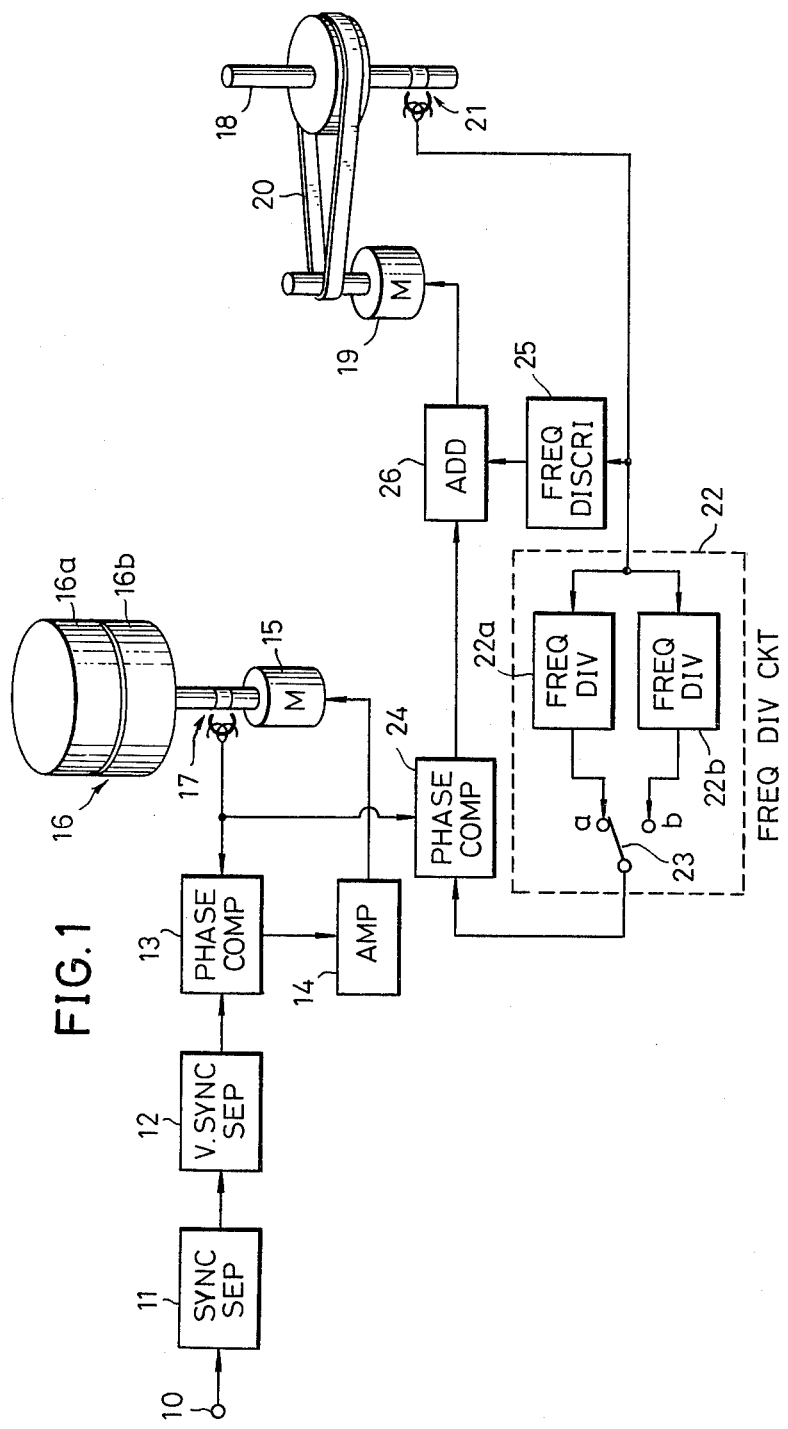

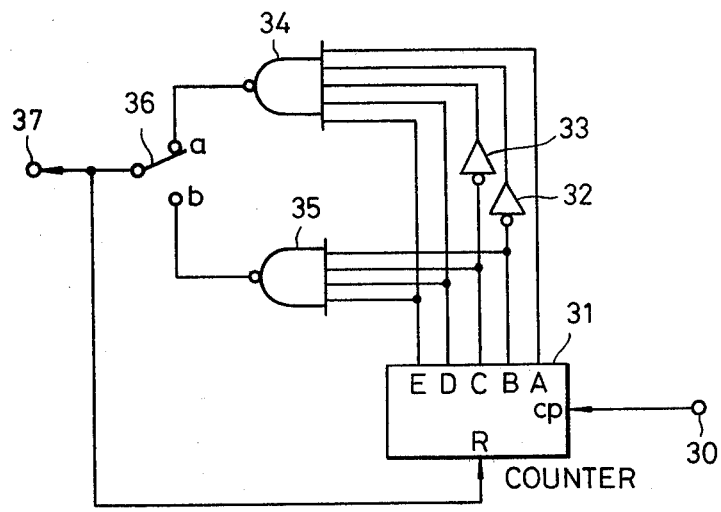
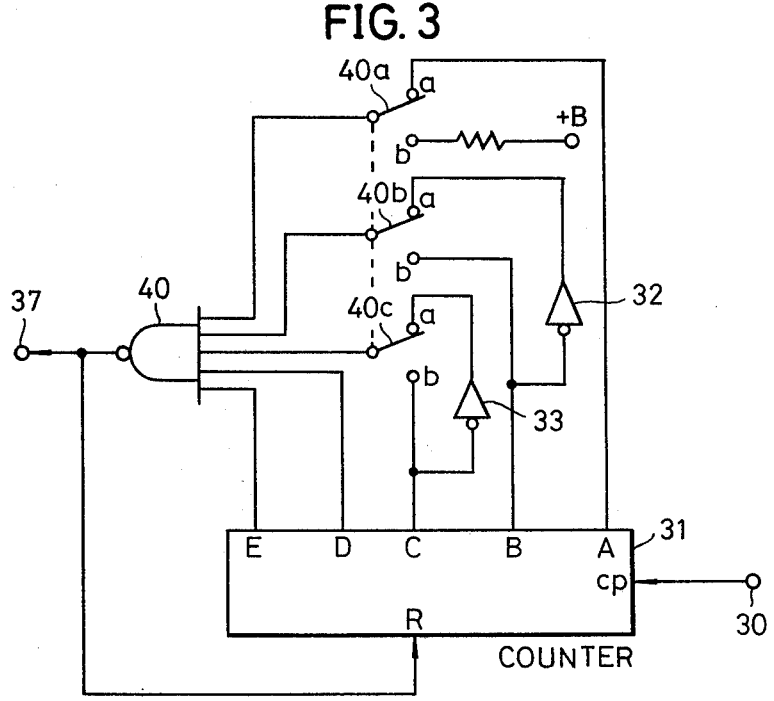

CAPSTAN SERVO SYSTEM IN A RECORDING AND/OR REPRODUCING APPARATUS

BACKGROUND OF THE INVENTION

The present invention relates generally to capstan servo systems used in recording and/or reproducing apparatus, and more particularly to a capstan servo system used in an apparatus capable of selectively recording and/or reproducing either NTSC system video signals or CCIR system video signals even though the video signals of these two systems have different frame frequencies.

In an apparatus for recording/reproducing video signals, a capstan servo system is generally adapted for stabilizing tape travel. The capstan servo system known heretofore generally comprises a detector for detecting the rotation of the capstan, a phase comparator for comparing the detected rotation signal and a phased reference signal. A frequency discriminator frequency discriminates the rotation signal. The rotation of the capstan motor is controlled in response to the sum signal of the phase comparison error signal and the frequency discrimination signal.

The NTSC system video signal has a frame frequency of 30 Hz while the CCIR system video signal has a frame frequency of 25 Hz. Accordingly, the frequency of the reference signal supplied to the above mentioned phase comparator differs depending upon the frame frequency of the system of the video signal which is to be recorded or reproduced. On the other hand, the tape travel speed must be the same irrespective of the system of the video signals to be recorded or reproduced. Therefore, there is a necessity for replacing the rotation detector and the frequency discriminator to conform with the system of the video signals recorded or reproduced.

However, it is extremely difficult or almost impossible for the operator to carry out the above described replacement operation in actual practice.

As another approach to the problem, it is possible to provide an apparatus wherein two sets of detectors and frequency discriminators are used to conform with the respective video signal systems. In such an apparatus, the operator would set a switch to put the detector and frequency discriminator, appropriate for the video signal system, into operation. This apparatus having two detectors and two frequency discriminators would be expensive and would not be practical. Moreover, in this case, as in the case of producing separate models for the NTSC and CCIR systems, the manufacturer would be burdened with the necessity of fabricating and building into his products two kinds of detectors and two kinds of frequency discriminators, thus increasing the number of components he would have to procure and stock.

SUMMARY OF THE INVENTION

Accordingly, it is an object of the present invention to provide a novel and useful capstan servo system for use in a recording/reproducing apparatus in which the above described difficulties have been overcome.

Another and specific object of the present invention is to provide a capstan servo system in a recording/reproducing apparatus in which a frequency dividing means divides the output signal of a detector according to the rotation of the capstan and supplies the signal thus frequency divided to a phase comparator. The phase of the signal is compared with a reference signal. The system is adapted to change over and to have its frequency division ratio set in conformance with the system of the video signals to be recorded or reproduced.

Still another object of the invention is to provide a capstan servo system in which the frequency of the signal output by the rotation detector (the rotation signal) is set to a common multiple of the frame frequency of the NTSC system video signal (30 Hz) and the frame frequency of the CCIR system video signal (25 Hz). The frequency of the rotation signal is divided in the frequency divider. The frequency division ration has been changed over and set in conformance with the system of the video signal to be recorded or reproduced. The rotational signal is then supplied to the phase comparator in the servo loop. According to the system of the present invention, an apparatus capable of recording and/or reproducing video signals of either system can be reduced to practice with a simple circuit arrangement.

Other objects and further features of the present invention will be apparent from the following detailed description when read in conjunction with the accompanying drawings.

BRIEF DESCRIPTION OF THE DRAWINGS

In the drawings:

FIG. 1 is a block diagram showing one embodiment of a capstan servo system in a recording and/or reproducing apparatus according to the present invention;

FIG. 2 is a circuit diagram showing one embodiment of a frequency division circuit; and FIG. 3 is a circuit diagram showing another embodiment of a frequency division circuit.

DETAILED DESCRIPTION

Referring to FIG. 1, a video signal introduced through an input terminal 10 is supplied to a synchronizing signal separation circuit 11, where a synchronizing signal is separated out and then supplied to a vertical synchronizing signal separation circuit 12 for separating out a vertical synchronizing signal. The vertical synchronizing signal thus separated is supplied to a phase comparator 13. A rotary drum 16a having a pair of video heads mounted on diametrically opposite sides thereof, and a stationary drum 16b, together constitute a guide drum 16. A magnetic tape (not shown) is wrapped obliquely around the guide drum 16 substantially over a half circumference thereof and is driven to travel. The rotary drum 16a is rotated by a head motor 15. The rotation of the motor 15 is detected by a rotation detector 17 which comprises a magnet mounted on the rotary shaft of the motor 15 and an adjacent, and stationary, pickup head. The output signal of the rotation detector 17 is fed to the phase comparator 13, where its phase is compared with the phase of the above mentioned vertical synchronizing signal. The error signal output by the phase comparator 13 is supplied through an amplifier 14 to the motor 15 to control the rotation thereof.

When the signal supplied to the input terminal 10 is an NTSC system video signal having a frame frequency of 30 Hz, the motor 15 rotates at 30 rps. On the other hand, when the input signal is a CCIR system video signal having a frame frequency of 25 Hz, the motor 15 rotates at 25 rps. The signal from the rotation detector 17 is supplied as a reference signal to a phase comparator 24 in a capstan servo system to be described hereinafter.

The frequency fa of this reference signal (rotation signal) is 30 Hz for the NTSC system video signal and 25 Hz for the CCIR system video signal.

On the other hand, the rotation of a capstan motor 19 is transmitted through an endless belt 20 to a capstan 18 which rotates at a constant speed and drives the tape. The rotation of the capstan 18 is detected by a rotation detector 21 which comprises a magnet mounted on a rotary shaft of the capstan and an associated stationary pickup head. The signal of frequency fb thus detected by the rotation detector 21 is supplied to a frequency division circuit 22. The signal from the rotation detector 21 is frequency divided in the frequency division circuit 22 and is then supplied to the phase comparator 24 where its phase is compared with the phase of the reference signal from the rotation detector 17.

The frequency division ratio of the frequency division circuit 22 is defined as m. For proper function of the recording/reproducing apparatus, the following relationship should be maintained between the frequencies of the signals:

$$fb/m = N \cdot fa \quad (1)$$

where, N is a positive integer. This Eq. (1) can be rewritten as $fb = m \cdot N \cdot fa$. Accordingly, if the frequency dividing ratio m is an integer, the above equation becomes:

$$fb = K \cdot fa \quad (2)$$

where, K is a positive integer. The frequency fa is either 30 Hz or 25 Hz depending on which video signal system is in use. Accordingly, in order for Eq. (2) to be satisfied regardless of the value of fa (30 Hz or 25 Hz), it is sufficient for frequency fb to be a common multiple of 30 Hz and 25 Hz.

In this connection, in the system according to the present invention, the frequency fb of the signal output by the rotation detector 21 is expressed by the following equation:

$$fb = 150 \cdot M \text{ (Hz)} \quad (3)$$

where, M is a positive integer.

In the present embodiment, the parameter M equals 5 (m=5), and fb therefore equals 750 Hz (fb=750 Hz).

The frequency division circuit 22 is composed of frequency dividers 22a and 22b and a switch 23 for switching over between their outputs. The frequency division ratios of the frequency dividers 22a and 22b are respectively selected at 1/(5·M) and 1/(6·M).

In the present embodiment, in which the frequency fb is 750 Hz, the frequency division ratios of the frequency dividers 22a and 22b are 1/25 and 1/30, respectively.

When the NTSC system video signal is recorded and/or reproduced, the switch 23 is connected to contact a, and a signal having a frequency of 30 Hz is led out of the frequency divider 22a and fed to the phase comparator 24, where it is phase compared with a reference signal of 30 Hz from the rotation detector 17. Alternatively, when the CCIR system video signal is recorded or reproduced, the switch 23 is switched to the other contact b, and a 25 Hz signal from the other frequency divider 22b is supplied to the phase comparator 24, where it is phase compared with the reference signal of 25 Hz from the rotation detector 17.

The signal, having a frequency of fb, from the rotation detector 21 is also supplied to a frequency discriminator 25. The output frequency discriminated signal of the frequency discriminator 25 is fed to an adder 26, where it is added to the error signal output from the phase comparator 24. The sum signal is supplied to the motor 19 for controlling the rotation thereof.

Accordingly, merely through the operation of the change over switch 23, in conformance with the video signal system in use, the rotation of the motor 19 is controlled and the traveling speed of the tape driven by the capstan 18 is also controlled to be the same, irrespective of the video signal system.

Next, one concrete embodiment of the frequency dividing circuit 22 will be described in conjunction with FIG. 2. The signal having a frequency of 750 Hz from the rotation detector 21 is introduced through an input terminal 30 and is supplied to an input terminal cp of a binary-coded thirty-two scale counter 31, where it is counted. When the counter 31 has counted up to 25, the outputs of the output terminals A, B, C, D, and E respectively become "1", "0", "0", "1", and "1", in positive logic. The numeral "1" means a high level output and "0" means a low level output.

Among the output terminals of the counter 31, terminals A, D, and E are directly connected to different ones of the input terminals of a five-input NAND gate 34 while the output terminals B and C are respectively connected by way of inverters 32 and 33 to still different ones of the NAND gate 34 terminals. The output terminals B, C, D, and E are also connected directly to different input terminals of a four-input NAND gate 35. The output terminals of the NAND gates 34 and 35 are respectively connected to the contacts a and b of a switch 36.

When NTSC system video signals are to be recorded or reproduced, the switch 36 is connected to its contact a. When the counter 31 has counted twenty five input signal pulses, the outputs "1" of the output terminals A, D, and E are supplied as they are, and the outputs "0" of the output terminals B and C are inverted in the inverters 32 and 33 to become "1" and then are supplied to the NAND gate 34. Accordingly, when the counter 31 has counted the twenty-fifth input signal pulse, a coincidence of inputs of the NAND gate 34 takes place, and the output of the NAND gate is thereby converted from a high level to a low level. The low level output of the NAND gate 34 passes through the switch 36 and is supplied from an output terminal 37 to the phase comparator 24. Accordingly, the signal of 750 Hz fed to the terminal 30 is subjected to 1/25 frequency division, and is then led out as a signal of 30 Hz, through the terminal 37.

On the other hand, when CCIR system video signals are to be recorded or reproduced, the switch 36 is switched to its contact b. When the counter 31 has counted up to thirty, the outputs of the output terminals A through E are "0", "1", "1", "1", and "1" respectively, and there is a coincidence at the inputs of the NAND gate 35 connected to the output terminals B through E. Accordingly, when the counter has counted thirty input signal pulses, the output of the NAND gate 35 is converted from a high level to a low level. The low level output signal passes through the switch 36 and is fed from the output terminal 37 to the phase comparator 24 (FIG. 1). Accordingly, the signal of 750 Hz fed to the terminal 30 is subjected to a 1/30 frequency division, and is then led out as a signal of 25 Hz, through the terminal 37.

In either of the above instances, the counter 31 is reset when the output is led out through the switch 36 by the application of said output applied to a reset terminal R.

A second embodiment of the frequency division circuit 22 is indicated in FIG. 3. Parts in FIG. 3 which correspond to similar parts in FIG. 2 are designated by like reference numerals. Detailed description of such parts will not be repeated.

The output terminal A of the binary-coded thirty-two scale counter 31 is connected to the contact a of a switch 40a. The other contact b of the switch 40a is connected to a power source. The output terminal B is connected, on the one hand, to the contact a of a switch 40b by way of the inverter 32, and, on the other hand, to the other contact b of the switch 40b directly. The output terminal C is similarly connected, on the one hand, to the contact a of a switch 40c by way of the inverter 33, and, on the other hand, to the other contact b of the switch 40c directly. In a five-input NAND gate 40, three input terminals are respectively connected to the switches 40a through 40c, and the remaining two input terminals are respectively connected to the output terminals D and E of the counter 31. The switches 40a through 40c are ganged switches.

When NTSC system video signals are to be recorded or reproduced, the switches 40a through 40c are respectively connected to their contacts a. When the counter 31 has counted twenty-five input signal pulses, the outputs "1" of the output terminals A, D, and E are fed as they are, and the outputs "0" of the output terminals B and C are fed, after being inverted to become "1" in the inverters 32 and 33, to the NAND gate 40. Therefore, a coincidence of inputs to the NAND gate 40 takes place, and the 30 Hz signal obtained by subjecting the detection signal to a 1/25 frequency division is led out of the NAND gate 40. The counter 31 is reset by the output of the NAND gate 40.

On the other hand, when CCIR system video signals are to be recorded or reproduced, the switches 40a through 40c are respectively switched to contacts b. As a result of this switching operation, among the inputs of the NAND gate 40, that connected to the switch 40a, continuously assumes "1" irrespective of the output of the output terminal A. When the counter 31 has counted thirty input signal pulses, the outputs "1" of the output terminals B through E are fed as they are to the NAND gate 40. Accordingly, the 25 Hz signal which is obtained by subjecting the detection signal to a 1/30 frequency division is led out of the NAND gate 40. The counter 31 is reset by the output of the NAND gate 40 as in the preceding case.

One embodiment of the recording/reproducing apparatus according to this invention is adapted to be able to selectively carry out recording/reproduction of NTSC system video signals and CCIR system video signals. In this embodiment, the switches 23, 36, and 40a through 40c are changed over by the operator of the apparatus according to the system of the video signals in use. In each embodiment, as set forth above, the switches 23, 36, and 40a through 40c are ganged to change over with those of other circuits.

Moreover, in another embodiment of the invention, the recording/reproducing apparatus is intended exclusively for use for recording/reproducing either NTSC system video signals or CCIR system video signals. In this case, the system with which the apparatus can be used is fixed by the manufacture at the time of fabrication by pre-setting of the switches to the contacts for the system concerned. Moreover, in this case, a switch is not even necessary and the connection may be permanently made by soldering a contact terminal to either contact a or b according to the video signal system with which the apparatus is to be used.

What is claimed is:

1. A capstan servo system in a recording and/or reproducing apparatus comprising:
    means for detecting the rotation of a capstan for driving a tape;
    means for dividing the frequency of the output signal of said detection means;
    means for obtaining a reference signal having a frequency equal to the frame frequency of the system of the video signal to be recorded on and/or reproduced from said tape;
    means for comparing the phase of said frequency divided signal with the phase of said reference signal;
    means for frequency discriminating said output signal of said detection means; and
    means for adding the error signal output of said phase comparison means and the signal output of said frequency discrimination means to obtain a sum signal for controlling the rotation of a motor for driving said capstan,
said frequency dividing means enabling a selection of its frequency division ratio to perform a division of the frequency of said output signal of said detector means in accordance with the selected ratio, whereby the frequency of said output signal of said detector means is invariably divided into a frequency equal to the frequency of a reference signal regardless of changes in the frequency of the reference signal caused by differences in the frame frequencies of the video signals of different systems,
    said video signal systems being the NTSC system having a frame frequency of 30 Hz and the CCIR system having a frame frequency of 25 Hz,
said detection means producing an output signal having a frequency of 150 M Hz (where M is a positive integer), and said frequency division means enabling a frequency division ratio to be selected from between 1/5M and 1/6M,
said rotation detecting means producing a stream of output pulses, said frequency dividing means comprising:
    a binary-coded thirty-two scale counter for counting the pulses in the output signal of said detector means and for generating a high-level or a low-level output at five, or at the first through fifth output terminals thereof, responsive to said counting;
    two inverters connected to the second and third output terminals of said counter;
    a five-input NAND gate having five input terminals respectively connected to the first, fourth, and fifth output terminals of said counter and to said inverters;
    a four-input NAND gate having four input terminals respectively connected to the second through the fifth output terminals of said counter; and
    means for selectively leading out the output of said five-input NAND gate or said four-input NAND gate depending on whether the frame frequency of the video signals is 30 Hz or 25 Hz.

2. A capstan servo system in a recording and/or reproducing apparatus comprising:

means for detecting the rotation of a capstan for driving a tape;

means for dividing the frequency of the output signal of said detection means;

means for obtaining a reference signal having a frequency equal to the frame frequency of the system of the video signal to be recorded on and/or reproduced from said tape;

means for comparing the phase of said frequency divided signal with the phase of said reference signal;

means for frequency discriminating said output signal of said detection means; and means for adding the error signal output of said phase comparison means and the signal output of said frequency discrimination means to obtain a sum signal for controlling the rotation of a motor for driving said capstan, said frequency dividing means enabling a selection of its frequency division ratio to perform a division of the frequency of said output signal of said detector means in accordance with the selected ratio, whereby the frequency of said output signal of said detector means is invariably divided into a frequency equal to the frequency of a reference signal regardless of changes in the frequency of the reference signal caused by differences in the frame frequencies of the video signals of different systems, said video signal systems being the NTSC system having a frame frequency of 30 Hz and the CCIR system having a frame frequency of 25 Hz, said detection means producing an output signal having a frequency of 150 M Hz (where M is a positive integer), and said frequency division means enabling a frequency division ratio to be selected from between 1/5M and 1/6M, said rotation detecting means producing a stream of output pulses, said frequency dividing means comprising:

a binary-coded thirty-two scale counter for counting said detection signal pulses supplied thereto and for generating a high-level or a low-level output at five, or at the first through fifth output terminals thereof, responsive to said counting;

first and second inverters respectively connected to the second and third output terminals of said counter;

a first switching means which may be selectively switched between a contact connected to the first output terminal of said counter and a high level contact;

a second switching means which may be selectively switched between a contact connected to said first inverter and a contact connected to the second output terminal of said counter;

a third switching means which may be selectively switched between a contact connected to said second inverter and a contact connected to the third output terminal of said counter; and a NAND gate having five input terminals respectively connected to said first through third switching means and the fourth and fifth output terminals of said counter, said first through third switching means being switched in conformance with said video signal systems.

* * * * *